United States Patent
Blom et al.

(10) Patent No.: US 9,253,178 B2
(45) Date of Patent: Feb. 2, 2016

(54) METHOD AND APPARATUS FOR AUTHENTICATING A COMMUNICATION DEVICE

(75) Inventors: Rolf Blom, Järfälla (SE); Mats Näslund, Bromma (SE); Karl Norrman, Stockholm (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 107 days.

(21) Appl. No.: 13/979,476

(22) PCT Filed: Jul. 19, 2011

(86) PCT No.: PCT/EP2011/062361
§ 371 (c)(1),
(2), (4) Date: Jul. 12, 2013

(87) PCT Pub. No.: WO2012/097883
PCT Pub. Date: Jul. 26, 2012

(65) Prior Publication Data
US 2013/0291071 A1    Oct. 31, 2013

Related U.S. Application Data (60) Provisional application No. 61/433,390, filed on Jan. 17, 2011.

(51) Int. Cl.
*H04L 29/00* (2006.01)
*H04L 29/06* (2006.01)
*H04L 9/08* (2006.01)
*H04L 9/32* (2006.01)
*H04W 12/06* (2009.01)
*H04W 4/00* (2009.01)

(52) U.S. Cl.
CPC .............. *H04L 63/08* (2013.01); *H04L 9/0833* (2013.01); *H04L 9/321* (2013.01); *H04L 9/3271* (2013.01); *H04L 63/104* (2013.01); *H04W 12/06* (2013.01); *H04L 63/107* (2013.01); *H04L 2209/80* (2013.01); *H04W 4/005* (2013.01)

(58) Field of Classification Search
CPC ...... H04L 63/08; H04L 63/104; H04L 63/107
USPC ............................................................ 726/4
See application file for complete search history.

(56) References Cited

U.S. PATENT DOCUMENTS 6,487,402 B1 * 11/2002 Faus et al. ...................... 455/411
2003/0200305 A1 * 10/2003 Tarby ..................... H04L 29/06
                                                            709/224

(Continued)

FOREIGN PATENT DOCUMENTS

| EP | 0711090 A2 | 6/1996 |
|---|---|---|
| WO | 9748208 A1 | 12/1997 |
| WO | WO 9748208 A1 * | 12/1997 |

*Primary Examiner* — Hadi Armouche
*Assistant Examiner* — Ali Shayanfar
(74) *Attorney, Agent, or Firm* — Patents on Demand, P.A.; Brian K. Buchheit; Scott M. Garrett (57) ABSTRACT

According to an aspect of the present invention there is provided a method of operating a communication device, the communication device being part of a group comprising two or more communication devices that share a subscription to a communication network. The method comprises receiving a group authentication challenge from the network, at least part of the group authentication challenge having been generated using group authentication information that is associated with the shared subscription. The device then generates a device specific response to the group authentication challenge using the group authentication information and device specific authentication information and sends the device specific response to the network. The device is for example a member of a machine-type communication device group.

18 Claims, 4 Drawing Sheets

(56) References Cited

U.S. PATENT DOCUMENTS

| | | | |
|---|---|---|---|
| 2005/0009520 A1* | 1/2005 | Herrero | H04L 29/12188 455/435.1 |
| 2005/0138355 A1* | 6/2005 | Chen | H04L 63/08 713/155 |
| 2006/0235796 A1* | 10/2006 | Johnson | G06Q 20/02 705/44 |
| 2007/0043947 A1* | 2/2007 | Mizikovsky | H04L 63/0869 713/172 |
| 2009/0054036 A1 | 2/2009 | Chen et al. | |
| 2012/0023325 A1* | 1/2012 | Lai | 713/155 |

\* cited by examiner

METHOD AND APPARATUS FOR AUTHENTICATING A COMMUNICATION DEVICE

TECHNICAL FIELD

The present invention relates to a method and apparatus for authenticating a communication device that is part of a group, the group comprising two or more communication devices that share the same subscription. More particularly, the invention relates to a method and apparatus for authenticating a Machine-type Communication (MTC) Device that is part of an MTC Group.

BACKGROUND

Figure 1:
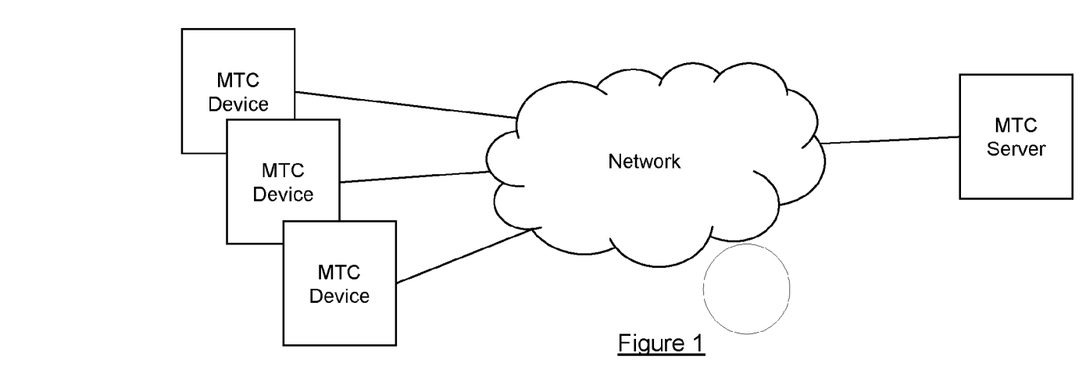
FIG. 1 illustrates schematically a Machine-type communication scenario.

The 3rd Generation Partnership Project (3GPP) is currently working to define a comprehensive set of network improvements for Machine-type communication (MTC). Machine-type communication, also known as Machine-to-Machine (M2M) communication, is a form of data communication which involves one or more entities that do not necessarily need human interaction. These entities are referred to as MTC Devices, wherein a MTC Device is a communication device equipped for Machine-type communication and which communicates through a Public Land Mobile Network (PLMN) with one or more MTC Servers and/or one or more other MTC Devices. An MTC Server is a server that communicates with MTC Devices through the PLMN, has an interface which can be accessed by a MTC User, and performs services for the MTC User. The MTC Server also has an interface which can be accessed by a MTC User and performs services for the MTC User. FIG. 1 illustrates schematically a Machine-type communication scenario.

Machine-type communication may be facilitated by the data services offered by existing mobile communication networks. However, a service optimised for machine-type communications differs from a service optimised for human-to-human communications. In particular, machine-type communications are different to current mobile network communication services as they involve different market scenarios, data communications, lower costs and effort, and a potentially very large number of communicating terminals with, to a large extent, little traffic per terminal.

In conventional 3GPP systems, a communication device is allowed to attach to/access a communication network if the device is associated with a subscription that allows the communication network to authenticate the device. For example, the 3GPP Authentication and Key Agreement (AKA) procedure makes use of a globally unique subscriber identity, known as the International Mobile Subscriber Identity (IMSI), which is typically stored on a Universal Subscriber Identity Module (USIM) within a communication device, in order to identify a subscription and thereby authenticate the device. Consequently, an IMSI is typically associated with only one communication device at any one time. However, if each MTC Device were to be associated with a unique subscriber identity (e.g. IMSI), then each MTC Device would need to be individually authenticated using the unique authentication information (e.g. a shared secret key etc) provided in the associated subscription. Due to the very large number of MTC Devices, this individual authentication would generate a large amount of signaling, increasing the load on the network. This would also likely to be a waste of both bandwidth and authentication vectors, especially as it is likely that a proportion of these MTC Devices will not communicate with the network at all. In addition, given that it is likely that there will be a very large number of MTC Devices, if each MTC Device were to be associated with a unique subscriber identity (e.g. IMSI), then the currently defined range of subscriber identities could rapidly be exhausted. Moreover, most MTC Devices will be low power devices that will therefore want to avoid any unnecessary signaling and processing in order to conserve their batteries. This may be particularly important, as it is envisaged that there will be MTC Devices whose batteries will not be changed and that will simply be disposed of when their battery has been drained.

It is therefore desirable to provide an efficient mechanism for authenticating MTC Devices whilst minimizing any modifications that are to be made to the infrastructure provided for subscriber authentication that has already been defined and is currently available in existing communication networks.

SUMMARY

It is an object of the present invention to provide an efficient mechanism for authenticating a device that is part of a group comprising two or more communication devices that share a subscription to a communication network.

According to a first aspect of the present invention there is provided a method of operating a communication device, the communication device being part of a group comprising two or more communication devices that share a subscription to a communication network. The method comprises receiving a group authentication challenge from the network, at least part of the group authentication challenge having been generated using group authentication information that is associated with the shared subscription. The device then generates a device specific response to the group authentication challenge using the group authentication information and device specific authentication information and sends the device specific response to the network.

This method enables a communication device that is part of a group of communication devices to provide assurance that it is part of the group whilst simultaneously also providing assurance regarding the identity of the individual communication device.

Prior to receiving the group authentication challenge, the device may store the group authentication information and the device specific authentication information. To store the group authentication information and the device specific authentication information, the device may receive an identity module, the identity module being associated with the subscription and storing at least part of the group authentication information. The generation of a device specific response by the device may then be at least partly based on information provided by the identity module.

The method may further comprise sending a service request to the network, the request including an identifier for the group. A service request can be any one of a request for network access, a request for IP connectivity, and a request to use an application, server or service.

The method may further comprise including an identifier for the device in the response sent to the network. The method may also comprise including an identifier for the group authentication challenge in the response sent to the network. The identifier for the group authentication challenge may be received from the network together with the group authentication challenge. Alternatively, the method may comprise using at least part of the group authentication challenge and an identifier for the group to derive the authentication challenge identifier for inclusion in the response.

The method may further comprise, following receipt of the group authentication challenge, using the group authentication information and at least part of the received group authentication challenge to generate one or more session keys. The one or more session keys and the device specific authentication information can then be used to generate one or more device specific session keys.

According to a second aspect of the present invention there is provided a method of operating a node of a communication network in order to authenticate a communication device, the communication device being part of a group comprising two or more communication devices that share a subscription to a communication network. The method comprises using an identifier for the group to obtain a group authentication challenge and an expected response. The group authentication challenge is then sent to one or more of the devices and a response received from one of the communication devices. An identifier for the device is then used to establish device specific authentication information, and this device specific authentication information is used to determine if the received response is a valid response to the authentication challenge. If the received response is a valid response to the authentication challenge, then the node authenticates the device.

The authentication may be initiated by receipt of a service request, the service request including the identifier for the group. The service request may be received from one of the devices, and the group authentication challenge is then sent to the device from which the service request is received. Alternatively, the service request may be received from a server, the request including the identifier for the group. The group authentication challenge is then sent to all of the devices that are part of the group, and the response from the device includes an identifier for the device.

The response received from one of the devices may include an identifier for the group authentication challenge, the identifier for the group authentication being used to identify the authentication challenge to which the device is responding. The method may further comprise determining an identifier for the group authentication challenge and including the identifier for the group authentication challenge when sending the group authentication challenge to the device. Alternatively, the method may comprise determining an identifier for the group authentication challenge and storing the group authentication challenge together with the identifier for the group authentication challenge.

The step of using the group identifier to obtain a group authentication challenge and an expected response may further comprise sending a request for authentication data to a subscriber database, the request including the identifier for the group; and receiving a response from the subscriber database including the group authentication challenge and an expected response.

The step of using the device specific authentication information to determine if the received response is a valid response may comprise using the device specific authentication information and the expected response to generate a device specific expected response, and determining that the received response is valid if the device specific expected response matches the received response.

The response from the subscriber database may also include one or more session keys that have been generated using the group authentication information and at least part of the group authentication challenge. If so, then the method may further comprise, after the device specific authentication information has been established, using the one or more session keys received from the subscriber database and the device specific authentication information to generate one or more device specific session keys.

According to a third aspect of the present invention there is provided an apparatus configured to operate as a communication device that is part of a group comprising two or more communication devices that share a subscription to a communication network. The apparatus comprises a receiver for receiving a group authentication challenge from the network, the group authentication challenge having been generated using group authentication information that is associated with the shared subscription, a processor for generating a device specific response to the group authentication challenge using the group authentication information and device specific authentication information, and a transmitter for sending the device specific response to the network.

The apparatus may further comprise a memory storing one or more of the group authentication information and the device specific authentication information. The apparatus may further comprise a receiver for receiving an identity module, the identity module being associated with the subscription and storing at least part of the group authentication information.

The apparatus may be further configured to generate a service request including an identifier for the group, and to send the authentication request to the network. The apparatus may be further configured to include an identifier for the device in the response sent to the network.

The apparatus may be further configured to include an identifier for the group authentication challenge in the response sent to the network. The apparatus may be further configured to receive the identifier for the group authentication challenge from the network together with the group authentication challenge. Alternatively, the apparatus may be further configured to use at least part of the group authentication challenge and an identifier for the group to derive the authentication challenge identifier for inclusion in the response.

The apparatus may be further configured to use the group authentication information and at least part of the received group authentication challenge to generate one or more session keys, and to use the one or more session keys and the device specific authentication information to generate one or more device specific session keys.

According to a fourth aspect of the present invention there is provided an apparatus configured to authenticate a communication device to a communication network, the communication device being part of a group comprising two or more communication devices that share a subscription to a communication network. The apparatus comprises a processor for using an identifier for the group to obtain a group authentication challenge and an expected response, a transmitter for sending the group authentication challenge to one or more of communication the devices, and a receiver for receiving a response from one of the communication devices. The processor is configured to use an identifier for the device to establish device specific authentication information, and to use the device specific authentication information to determine if the received response is a valid response to the authentication challenge and thereby authenticate the device.

The apparatus may be further configured to initiate the authentication upon receipt of a service request, the service request including an identifier for a group. The apparatus may be further configured to receive the service request from one of the devices, and to send the group authentication challenge to the device. Alternatively, the apparatus may be further configured to receive the service request from a server, the request including an identifier for the group, and to send the group authentication challenge to all of the devices that are part of the group.

The apparatus may be further configured to receive a response from one of the communication devices that includes an identifier for the group authentication challenge, and to use the identifier for the group authentication to identify the authentication challenge to which the device is responding. The apparatus may be further configured to determine an identifier for the group authentication challenge and to include the identifier for the group authentication challenge when sending the group authentication challenge to the device. Alternatively, the apparatus may be further configured to determine an identifier for the group authentication challenge and to store the group authentication challenge together with the identifier for the group authentication challenge.

The apparatus may be further configured to send a request for authentication data to a subscriber database, the request including the identifier for the group, and receive a response from the subscriber database including the group authentication challenge and the expected response. The apparatus may be further configured to use the device specific authentication information and the expected response to generate a device specific expected response, and to determine that the received response is valid if the device specific expected response matches the received response.

The apparatus may be further configured to receive the response from the subscriber database that also includes one or more session keys generated using the group authentication information and at least part of the group authentication challenge, and use the one or more session keys received from the subscriber database and the device specific authentication information to generate one or more device specific session keys.

According to a fifth aspect of the present invention there is provided a computer program comprising computer program code means adapted to perform all the steps of the first aspect when said program is run on a computer.

According to a sixth aspect of the present invention there is provided a computer program according to the fifth aspect embodied on a computer readable medium.

According to a seventh aspect of the present invention there is provided a computer program comprising computer program code means adapted to perform all the steps of the second aspect when said program is run on a computer.

According to an eighth aspect of the present invention there is provided a computer program according to the seventh aspect embodied on a computer readable medium.

DETAILED DESCRIPTION

It is proposed here to make use of the concept of a MTC Group, as defined in 3GPP TS 22.368 v10.1.0, in order to provide a basis for an efficient mechanism for authenticating MTC Devices. According to 3GPP TS 22.368, a MTC Group is a group of MTC Devices that belong to the same MTC Subscriber. It is therefore straightforward to associate all the MTC Devices within a MTC Group with the same subscription and therefore the same subscription identifier. On this basis, all of the MTC Devices within a MTC Group could also share authentication information, such as a single shared group key, that can be used for performing authentication of each MTC Device to the network. Such a solution would conserve the available subscription identifiers and authentication vectors. However, such a solution would also mean that any single MTC Device within the MTC Group becomes a single point of failure. Specifically, since all devices would then store/contain exactly the same authentication related information, any single device that is compromised could then be used to impersonate any other device within the group, thereby enabling an attacker to spy on the traffic of any other device in the group.

This problem could be overcome by making use of the concepts of either group signatures or ring signatures. A group signature (see "Group signatures", D. Chaum and E. van Heyst, Proceedings of EUROCRYPT 1991, pp. 257-265) allows one or more members of the group to anonymously sign a message on behalf of the group, such that a third party can verify that the signature comes from someone within the group but not exactly who. However, it is essential to the group signature concept that there is a group manager who is in charge of adding group members and has the ability to reveal the identity of the original signer in the event of disputes. A ring signature (see "How to Leak a Secret", R. Rivest, A. Shamir, and Y. Tauman, Proceedings of ASIACRYPT 2001, pp. 554-567) is similar to a group signature, but does not allow anyone to identify which member of the group produced a signature and therefore does not require a group manager. However, the levels of computational load and signaling required to implement these concepts is relatively high such that they are unsuitable for use in MTC. In addition, for MTC it may be beneficial to be able to identify the individual MTC Device involved in a communication, such that the anonymity provided by either of these concepts is itself undesirable. Furthermore, the group and ring signature concepts are based on asymmetric cryptography, which has seen almost no deployment in mobile networks.

It is therefore also proposed here that the authentication of a MTC Device that is part of a MTC Group be based on the challenge-response mechanisms defined for 3GPP AKA, whilst making use of both group authentication information that is shared by all of the MTC Devices within the group, and device specific authentication information that is used by only a single MTC Device within the group. According to the method proposed herein, a group authentication challenge is generated by the network using the group authentication information. This group authentication challenge is sent to one or more of the MTC Devices that are part of the group. In order to authenticate itself to the network, a MTC Device generates a device specific response using both the group authentication information and the device specific authentication information, and sends this device specific response to the network. The network can then determine if the received response is a valid response to the authentication challenge in order to authenticate the MTC Device. This method of authentication enables an MTC Device to provide assurance that it is part of a MTC Group whilst simultaneously also providing assurance regarding the identity of the individual MTC Device.

In order to implement the method outlined above, each MTC Device within a MTC Group could be provided with a Group ID that identifies the MTC Group and that can be used by the network to identify the subscription shared by all of the MTC Devices that are part of the MTC Group. For example, the Group ID could be a shared common IMSI assigned to the MTC Group. However, for security reasons, it may be preferable that the IMSI is not sent in plaintext. In such circumstances, the Group ID should be a separate identity (e.g. the Mobile Subscription Identification Number (MSIN) corresponding to the IMSI or some other application specific identifier) that the network can use to determine the associated IMSI, as it is the IMSI on which the authentication is based.

The Group ID would then be used by the network in order to request the group authentication information from a subscriber server/database such as a HSS/AuC. The subscriber database would then determine the group authentication information using a Group Key (K) that is associated with the IMSI of the MTC Group, having identified the group's IMSI and therefore the group's subscription from the Group ID. This Group Key is a shared secret key known to the subscriber database and stored within a secure environment within each of the MTC Devices that are part of the MTC Group. The subscriber database then uses the Group Key to determine an Authentication Vector (AV) for the MTC Group.

Figure 2:
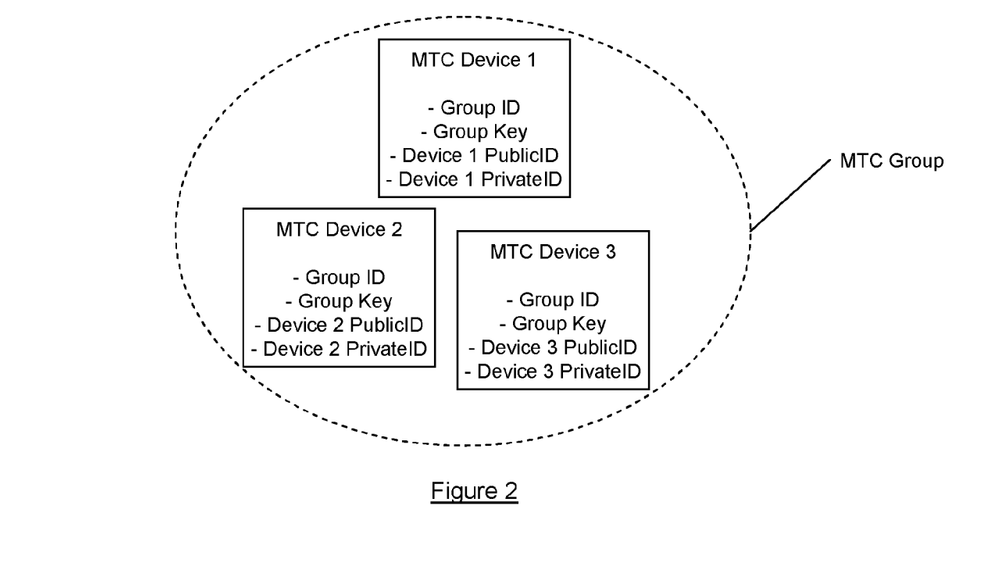
FIG. 2 illustrates an example of an MTC Group and the information stored within each MTC Device within the MTC Group.

Each MTC Device can also be provided with a Device Public ID and a Device Private ID. The Device Public ID is individual/unique to a MTC Device within a MTC Group and is used to signal the identity of the MTC Device to and from the network. The combination of the Group ID and the Device Public ID therefore provides a globally unique identifier for the MTC Device. The Device Private ID is also individual/unique to a MTC Device and is used as the device specific authentication information. The network is able to determine the Device Private ID (i.e. the device specific authentication information) of a MTC Device from the Device Public ID. For example, the network can maintain a mapping between the Device Private ID and the Device Public ID, and/or can derive the Device Private ID from the Device Public ID using a cryptographic function, e.g. an encryption function or pseudo-random function. In addition, if the Device Private ID can be derived from the Device Public ID using such a function, then this function could also be salted with a RAND and/or AUTN. FIG. 2 illustrates an example of an MTC Group and the information that would be available to each MTC Device within the MTC Group for use in such authentication procedures.

Figure 3:
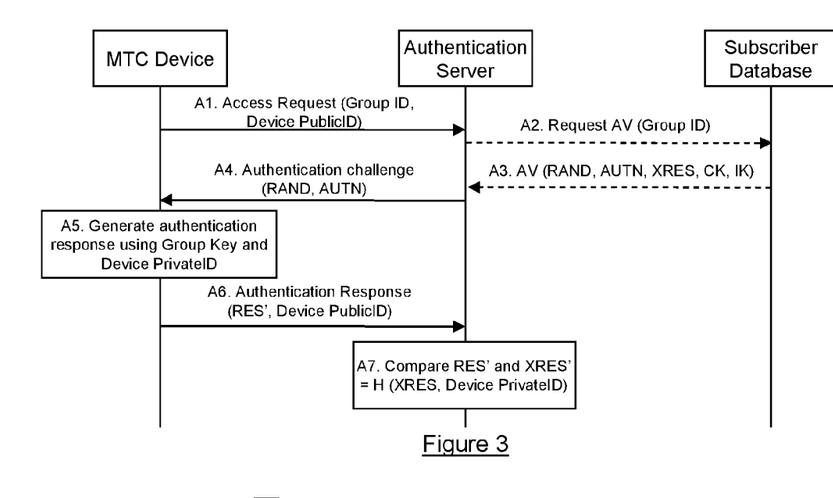
FIG. 3 is an example signalling flow diagram of the authentication of a MTC Device to a communication network.

FIG. 3 is an example signalling flow diagram of the authentication of a MTC Device to a communication network, the MTC Device being part of a MTC Group. The steps performed are as follows:

A1. An MTC Device that is part of a MTC Group sends a message to an authentication server within the communication network. The authentication server is the function representing the network in the authentication procedure. For example, the authentication server could be any one of a Mobility Management Entity (MME), a Mobile Switching Center (MSC) or a Serving Gateway Support Node (SGSN). The message includes the Group ID of the MTC Group to which the MTC Device belongs and the Device Public ID. For example, this message could be a request to access the communication network. Alternatively, the authentication server could be an authentication server in a M2M service network, providing service layer authentication rather than access layer authentication, and in this case the message sent by the MTC Device could be a request for service.

A2. The authentication server uses the Group ID to request an authentication vector (AV) from a subscriber server/database. For example, if the Group ID is not the IMSI of the MTC Group, then the authentication server could use the Group ID to obtain the IMSI for the MTC Group, either by mapping the Group ID to the IMSI, or by requesting some translation function perform the mapping on its behalf. The authentication server would then send a request for an authentication vector to the subscriber server/database, the request including the IMSI of the MTC Group. Alternatively, the authentication server could send a request for an authentication vector to the subscriber server/database, the request including the Group ID. In this case, if the Group ID is not the IMSI of the MTC Group, then the subscriber server/database, when receiving the request, would be further required to map the Group ID to the IMSI. To do so, the Group ID would need to be formatted such that it can be used to identify the appropriate subscriber server/database. In addition, prior to requesting an authentication vector from a subscriber database, the authentication server could determine whether it has an authentication vector associated with the identified group stored within it's memory and, if so, make use of this authentication vector to perform the authentication.

A3. The subscriber database determines/generates an authentication vector using the group authentication information associated with the MTC Group identified in the request. For example, the subscriber database could use the IMSI to identify the group's subscription, retrieve the Group Key (K) from the group's subscription, and use the Group Key to generate the authentication vector. A typical AV can include a random number (RAND), a network authentication token (AUTN), an expected authentication response (XRES), and session keys (Ck, Ik).

A4. The subscriber database responds to the authentication server with the group authentication vector.

A5. The authentication server receives and stores the group authentication vector. The authentication server then generates an authentication challenge/request for the MTC Device using some of the parameters that are included within the group authentication vector. For example, the authentication server could include the random number (RAND) and the network authentication token (AUTN) in the authentication challenge. The authentication server then sends the authentication challenge to the MTC Device.

A6. MTC Device receives the authentication challenge/request from the authentication server and generates a device specific response using the Group Key and the Device Private ID (i.e. the device specific authentication information). For example, the MTC Device could use the Group Key and the RAND received as part of the authentication challenge as inputs to a cryptographic function in order to generate an authentication response (RES). The MTC Device could then use the authentication response (RES) and the Device Private ID as inputs to a further function in order to generate the device specific authentication response (RES'). The MTC Device would send then send the device specific authentication response (RES') to the authentication server in response to the authentication challenge.

A7. The authentication server receives the device specific authentication response (RES') from the MTC Device and determines if this is a valid response to the authentication challenge. To do so, the authentication server could use the Device Public ID to determine/derive the Device Private ID. The authentication server can then use the expected response (XRES) received as part of the authentication vector and the Device Private ID as inputs to a function in order to generate a device specific expected response (XRES'). The authentication server will then authenticate the device if the device specific authentication response (RES'), received from the MTC Device, matches the device specific expected response (XRES').

In the procedure outlined above, the authentication server performs functional steps that are not necessary in currently deployed mobile networks, which do not provide efficient mechanisms for performing authentication of groups of device. For example, in step A7 above, the authentication server generates a device specific expected response in order to compare this with the response received from the device. However, in currently deployed mobile networks the expected response received as part of the authentication information provided by the subscriber database is already device specific, and can simply be compared with the response received from a device in order to perform the authentication.

The signalling used to implement the procedure outlined above is substantially the same as that of the standard AKA procedures defined for UMTS and EPS, with one difference being the information communicated by that signalling. This is beneficial as it provides that the authentication signalling is transparent to the (radio) access network such that only the authentication server is required to perform additional processing.

In order to request an authentication vector (AV) from a subscriber server/database, the authentication server is required to be able to send the request to the appropriate subscriber server/database. If the Group ID of each MTC Group is the IMSI assigned to the group, or if each MTC Group is assigned a Group ID which follows the current format used for the IMSI, then the mechanisms currently used by mobile networks in order to perform a look-up of the address of the subscriber server/database, or to route a request for authentication information to the subscriber server/database can be re-used in order to obtain the group authentication information for a device that is part of a group. For example, the authentication server could map the Group ID to location/address of the subscriber server/database. Such a mapping is trivial if the IMSI assigned to the group is used as the Group ID. Alternatively, if the Group ID does not have the same format as the IMSI, then the format of the Group ID should enable the authentication server to identify the appropriate subscriber database. For example, the Group ID could take the form of a realm or domain name identifying the network operator of which the MTC Group is a subscriber and a group identifier that is local to that network operator. An authentication server could then identify the subscriber database from the realm/domain name part of the Group ID, e.g. using DNS mechanisms.

As noted above, the device specific authentication response (RES') is generated by performing further processing of the group authentication response (RES) using the device specific authentication information (i.e. the Device Private ID). This further processing could involve the application of a pseudo-random function (PRF), such as a hash function, to the group authentication response (RES) using the Device Private ID. This ensures that an attacker who records the device specific authentication response (RES') from one or more MTC Devices within a group cannot derive the device specific authentication response (RES') of any other MTC Device within the group. This processing may also include the addition of a salt. For example, the generation of the device specific authentication response (RES') could be salted using the RAND and/or the AUTN from the group authentication challenge. Alternatively, or in addition, the salt could make use of other context parameters that are known to both the MTC Device and the network, such as the Group ID or IMSI.

As noted above, the authentication vector provided by the subscriber database may also include one or more session keys (e.g. CK, IK) that are generated using the Group Key (K) from the group's subscription. For example, these session keys could be generated by the application of a pseudo-random function that uses the RAND and the Group Key (K) as inputs. If so, then the authentication server can use the device specific authentication information to generate one or more device specific session keys (CK', IK'). By way of further example, the one or more device specific session keys (CK', IK') could be generated by the application of a pseudo-random function that uses the session keys (CK, IK) and the device specific authentication information as inputs. The MTC Device can also derive the session keys (CK, IK) using at least part of the group authentication challenge received from the authentication server (e.g. the RAND) and the Group Key (K). The MTC Device can therefore also derive the same device specific session keys (CK', IK'), in the same way as the authentication server, using the derived session keys (CK, IK) and the device specific authentication information. In addition, the generation of device specific session keys may also include the addition of a salt. For example, the generation of the device specific session keys (CK', IK') could be salted using the RAND and/or the AUTN from the authentication challenge. Alternatively, or in addition, the salt could make use of other context parameters that are known to both the MTC Device and the network, such as the Group ID or IMSI.

Figure 4:
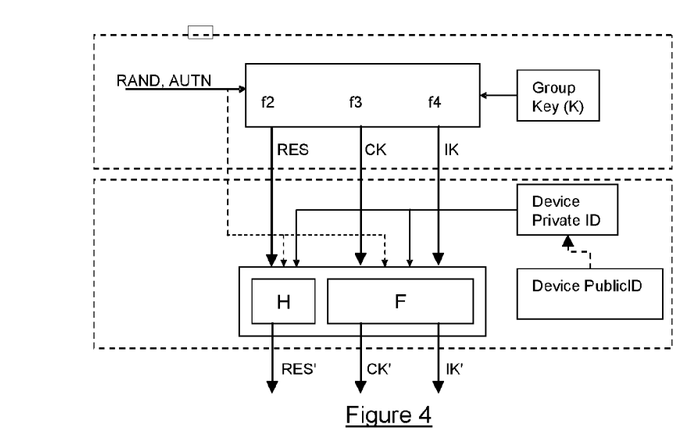
FIG. 4 illustrates an example of the processing implemented by an MTC Device in order to generate device specific authentication parameters.

FIG. 4 illustrates an example of the processing implemented by an MTC Device in order to generate the device specific authentication response (RES') and the device specific session keys (CK', IK'). Similar processing would also be implemented by the authentication server in order to generate the device specific expected response (XRES') and the device specific session keys (CK', IK').

These device specific session keys (CK', IK') can then be stored and used to secure communications between the MTC Device and the network. Moreover, as the device specific session keys (CK', IK') can be derived by both the MTC Device and the network during the authentication process, these device specific session keys can be used to secure data that is sent with the authentication response. In other words, data secured using the device specific session keys can be piggybacked onto the authentication response sent from the MTC Device to the network.

An additional advantage of the authentication mechanism described herein is that the authentication challenge signalling is not specific to an individual device within the group, as the same authentication vector can be used for all of the devices within the group. As such, this mechanism also provides that the authentication of an MTC Device need not be initiated by the device itself, but can be initiated by the network paging all of the MTC Devices within the group by broadcasting a group authentication challenge.

Figure 5:
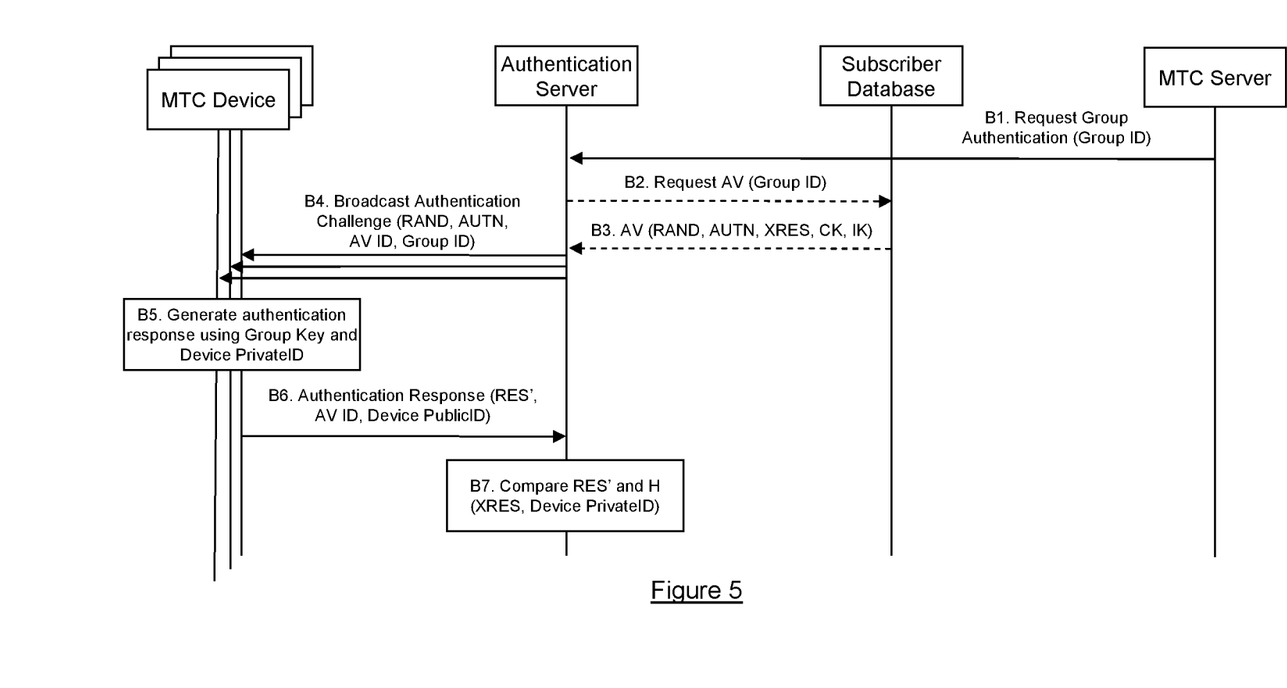
FIG. 5 is an example signalling flow diagram of the authentication of a MTC Device to a communication network.

FIG. 5 is an example signalling flow diagram of the authentication of a MTC Device to a communication network, the MTC Device being part of a MTC Group, in response to the broadcasting of a group authentication challenge. The steps performed are as follows:

B1. An MTC Server initiates the authentication of MTC Devices within a particular MTC Group by sending a request for authentication of a group to an authentication server, the MTC Group being identified by the Group ID. Alternatively, the authentication of MTC Devices within a particular MTC Group could be initiated by a request sent to the authentication server by any other node, or could be initiated by the server itself following activation of a trigger (e.g. a timer-based trigger etc).

B2. The authentication server uses the Group ID to request an authentication vector (AV) from a subscriber server/database. Prior to requesting an authentication vector from a subscriber database, the authentication server could determine whether it has an unused authentication vector associated with the identified group stored within it's memory and, if so, make use of this authentication vector to perform the authentication.

B3. The subscriber database determines/generates an authentication vector using the group authentication information associated with the MTC Group identified in the request. For example, the subscriber database could map the Group ID to the IMSI assigned to the group, use the IMSI to identify the group's subscription, retrieve the Group Key (K) from the group's subscription, and use the Group Key to generate the authentication vector. A typical AV can include a random number (RAND), a network authentication token (AUTN), an expected authentication response (XRES), and session keys (CK, IK).

B4. The subscriber database responds to the authentication server with the group authentication vector.

B5. The authentication server receives and stores the group authentication vector. The authentication server then generates an authentication challenge/request for the MTC Group using some of the parameters that are included within the group authentication vector. For example, the authentication server could include the random number (RAND) and the network authentication token (AUTN) in the authentication challenge. The authentication server also generates a tag or label for the authentication challenge that identifies the authentication challenge as intended for MTC Devices that are part of the MTC Group identified by the Group ID. The authentication server then broadcasts the tagged/labelled authentication challenge, and can continue to broadcast the authentication challenge at regular intervals until it receives a response. In addition, in case the authentication server is required to broadcast different authentication challenges to the same MTC Group, the authentication server can determine an identifier for the group authentication challenge. The group authentication challenge identifier can be derived from the RAND, the AUTN, an incremental counter, a timestamp, and/or any other information shared by the network and the MTC Devices that are part of the group, or it can be an assigned value. If the identifier is an assigned value then the authentication server must include the group authentication challenge identifier with the group authentication challenge when broadcasting the challenge. If the identifier is derived from information that is shared between the network and the MTC Device, then the identifier does not need to be broadcast with the authentication challenge. The authentication server will then store the group authentication challenge identifier in association with the group authentication vector.

B6. One or more of the MTC Devices within the MTC Group receive the broadcast group authentication challenge/request from the authentication server, and use the tag/label to identify the authentication challenge as intended for the MTC Group of which they are a part. They can then store the authentication challenge until they want (or need) to communicate. When one of these MTC Devices then determines that it wishes to communicate, the MTC Device generates a device specific authentication response (RES') using the Group Key and the Device Private ID (i.e. the device specific authentication information). The MTC Device then sends the device specific authentication response (RES') to the authentication server together with the Device Public ID. If required, the MTC Device will also include the group authentication challenge identifier in the response. The group authentication challenge identifier can be derived at the MTC Device using information shared between the MTC Device and the network, or, if the group authentication challenge identifier was included with the group authentication challenge, then it can be copied from the received group authentication challenge. In addition, if the MTC Device has data that it is ready to send, the MTC Device may calculate device specific session keys (CK', IK') and use these keys to securely piggyback the data onto the response to the authentication challenge.

B7. The authentication server receives the device specific authentication response (RES') and the Device Public ID from the MTC Device and determines if this is a valid response to the authentication challenge. To do so, the authentication server uses the Device Public ID to determine/derive the Device Private ID. In addition, if the response from the MTC Device included a group authentication challenge identifier, then the authentication server can use the identifier to identify the authentication vector used to generate the authentication challenge. The authentication server then uses the expected response (XRES) from the authentication vector and the Device Private ID as inputs to a function in order to generate the device specific expected response (XRES'). The authentication server will then authenticate the device if the device specific authentication response (RES'), received from the MTC Device, matches the device specific expected response (XRES').

MTC Devices, and any network that supports Machine-type communication, could therefore be configured to support authentication that has been initiated by an individual device, and authentication that is initiated by the broadcast of an authentication challenge by the network. Supporting both mechanisms would enable an MTC Device to attach and authenticate itself to the network, even if it has missed an opportunity to attach in response to a broadcast authentication challenge. For example, in order to conserve battery power, an MTC device may apply Discontinuous Reception (DRX), temporarily switching the receiver off, and may therefore not receive all transmission directed to the MTC Group. Furthermore, support of both mechanisms provides a path for migrating from a system that only implements the standard AKA procedures for authentication of individual devices, to a system that implements broadcast group authentication challenges. Moreover, it also provides the flexibility for different types of MTC Devices to use the different authentication mechanisms according to their individual needs.

The information required to perform authentication must be known to an MTC Device and to the network (e.g. stored within, and retrievable from a subscriber database such as HSS/AuC). The group authentication information (e.g. the Group ID and the Group Key) and the device specific authentication information (e.g. the Device Public ID and the Device Private ID) must therefore be stored securely within the MTC Device. In this regard, it is noted that the Device Public ID need only be stored to resist modification/write, whereas Device Private ID and Group Key should also be able to resist extraction/read. This information could therefore be stored within a trusted environment provided within the MTC Device at the time of manufacture of the MTC Device. This would make it straightforward for the manufacturer of the MTC Device to maintain a record of the mapping between Device Public ID and Device Private ID of each MTC Device, as well as the group IMSI, Group ID and Group Key. Furthermore, the manufacturer would also be able to program this information into MTC Devices according to the customer's specification. If the trusted execution environment within each MTC Device is provided by a Universal Integrated Circuit Card (UICC), then this is the standard procedure.

As an alternative to these standard procedures, the group authentication information and the device specific authentication information could be stored within a trusted environment provided within the MTC Device by the operator of the network as a customisation step. This would provide for greater flexibility, and would be particularly valuable if an unplanned extension of an existing group was to be required, or if only a very small group of devices were to be deployed. As a further alternative providing even greater flexibility, the authentication information could be downloaded to a device from a provisioning server. Examples of such environments comprise those based on identity modules such as UICC or other smart cards, trusted platform modules (akin to the Trusted Platform Module (TPM) defined by Trusted Computing Group), secure environments provided by the CPU (e.g. ARM TrustZone), or environments provided by platform virtualization such as Xen, KVM, etc.

The mapping between the Device Public ID and the Device Private ID can be put into effect so as to take into account both the security and privacy requirements of the devices. If privacy is required, the mapping should be implemented in such a way that it is not possible to identify a transmission as having come from a particular MTC Device or from the same MTC Device as an earlier transmission. In order to achieve privacy, the mapping between the Device Public ID and the Device Private ID should be dynamic and change regularly/occasionally.

An efficient solution for implementing a dynamic and varying mapping between the Device Public ID and the Device Private ID would be to encrypt the Device Private ID to obtain the Device Public ID. The encryption key used in this encryption could be derived from information provided in the group authentication vector that is currently in use. In addition, a nonce, a timestamp or a counter could be introduced in this encryption process (e.g. as part of the key derivation function) to allow the Device Private ID to be mapped to multiple Device Public ID's using a single authentication vector. The nonce/timestamp/counter used would then have to be communicated from the MTC Device to the authentication server to allow the authentication server to derive the Device Private ID (e.g. by resolving the key). The MTC Device and the authentication server would then derive the same encryption key. The MTC Device would encrypt it's Device Private ID to obtain a Device Public ID, whilst the authentication server would decrypt the received Device Public ID to obtain the Device Private ID. In this way, the authentication server would not have to perform any special administrative or recording processes to be able to map the Device Public ID to the Device Private ID, as the mapping is derived from the current authentication vector.

For security, the mapping should be implemented in such a way that, should an attacker successfully break in to the trusted environment of one MTC device, and therefore obtain the Device Public ID and the Device Private ID, the attacker should not be able to determine the Device Private ID of any other MTC Device. Therefore, it should be infeasible for a third party to invert the mapping of the Device Private ID to the Device Public ID, and the mapping should be injective (i.e. the mapping should be one-to-one, such that the Device Public ID should map to only one Device Private ID and vice versa) over the set of values defined for the Device Private ID in order to guarantee that each Device Public ID uniquely corresponds to a Device Private ID.

To ensure that the mapping provides security, an MTC Device should not hold the information required to perform the corresponding mapping of another MTC Device. An efficient solution is to have a fixed mapping between the Device Public ID and the Device Private ID. For example, this fixed mapping could be achieved using encryption as discussed above or, using a cryptographic one-way function, such as the well known SHA-256 cryptographic hash function (e.g. Device Public ID=hash(Device Private ID)). An MTC Device would then only hold the Device Public ID and the Device Private ID for that device. The authentication server would then store the Device Public ID and the associated Device Private ID for all devices, or would be provided with a function that enables it to derive the Device Private ID from the Device Public ID. For example, this function could be an encryption/decryption function that makes use of a specific key. The key used in the encryption/decryption function could be part of the subscriber data retrieved from the subscriber server (i.e. stored in association with the IMSI of the group). If an encryption scheme is used for the mapping, the authentication server could be given access to the key used, assisted by the subscriber database, and could then derive the Device Private IDs locally. If, on the other hand, a hash function is used, the authentication server needs to be given, for each Public ID, the corresponding Private ID. The derivation of the Device Private ID by the authentication server using an encryption function would thus be more efficient than storing all of the Device Public ID's and the associated Device Private ID's, especially given that the authenticator server should be able to handle many different MTC Groups. Other means for provisioning the mapping information (i.e. the mappings themselves or the encryption/decryption function/keys) to the authentication server could also be used. For example, this information could be provisioned via the Operations and Management (OaM) system.

The mapping solutions described above could also be combined in order to provide both privacy and security. In this regard, a dynamic and varying mapping between the Device Public ID and the Device Private ID could be achieved using a key-dependant mapping procedure as outlined above. For example, the Device Private ID could be replaced at regular intervals and a corresponding but varying Device Public ID could then be derived using this Device Private ID and the appropriate key. The key used could be either a device specific key or a Group key. In either case, the authentication server would need to be given access to the key by the subscriber database. For example, the Public ID could be based on an encryption of a time varying parameter such as a nonce, a counter, or a time stamp.

Furthermore, in order to provide for privacy of the Group IDs, it is also possible that the Group ID could vary, in a way similar to that by which IMSI identifiers can vary by using a temporary IMSI, known as a TMSI. To do so, the authentication server could assign a local random alias for the (static) Group ID (e.g. immediately after successful authentication) and send the alias (preferably encrypted) to the MTC device(s). This would typically be done just after the initial authentication of an MTC Device. MTC Device(s), having received this temporary/random alias, would then use it instead of the static Group ID in subsequent communication with the authentication server. As the alias for the MTC Group is assigned locally by the authentication server it can map the alias back to the Group ID that was initially used by the authentication server if needed, e.g. to retrieve further authentication vectors from the subscriber database. As such, the subscriber database would be unaware that a local identity is used by the authentication server.

In addition, in order to allow multiple implementation of the authentication mechanisms described herein using a single authentication vector, a mechanism for keeping the authentication fresh can be introduced. One possible solution would be to introduce a counter into the device specific authentication procedures implemented by the MTC Device. As an alternative solution, the device specific authentication response (RES') and the device specific session keys (CK', IK') could be generated using hash chains by the successive application of the cryptographic function. In both cases, a counter would be used by the MTC Device to keep track of the number of authentication instances performed, and the current value of the counter would be sent to the authentication server by the MTC Device in the authentication response.

It may also be advantageous that any authentication challenges that are broadcast by an authentication server are given a limited lifetime. If required, an authentication challenge could then include an indication of the time at which the authentication challenge is due to expire. For example, this would allow an authentication server to delete any old authentication vectors that it has stored, and would also provide a means for implementing freshness. However, it may be difficult for an MTC Device to know when a received authentication challenge has expired and is therefore no longer valid. In particular, it may be that some MTC Devices will not be provided with internal clocks. In order to overcome this potential problem, the authentication challenges broadcast by an authentication server could include a time associated with the challenge (e.g. the time of creation of the challenge or the time at which the challenge was broadcast). The MTC Devices would then use this as an indication of the current time in order to determine when a stored authentication challenge is no longer valid.

According to 3GPP TS 22.368, a trigger indication can be sent to an MTC Device in order to trigger activity at the MTC Device. These trigger indications can be addressed to individual MTC Devices or to a group of MTC Devices. In many cases, it would be advantageous if these trigger indications were broadcast in order to activate/trigger any or all devices of the group. However, these trigger indications should be protected/encrypted to ensure that an attacker cannot generate fake trigger indications or replay earlier trigger indications. By implementing the authentication mechanisms described herein, it is also possible for a group session key to be generated from a current authentication vector for an MTC Group. For example, these trigger indications could be encrypted using the group session keys provided in the authentication vector received from the subscriber database (e.g. CK, IK). As an alternative, these trigger indications could be encrypted using a separate/alternative group session key derived from the group session keys provided in the authentication vector (e.g. CK, IK) and some cryptographic salt. This group session key could then be used to protect the integrity and confidentiality of any trigger indications broadcast to the MTC Group, and to protect against replays of earlier broadcast trigger indications. To provide replay protection, a fresh authentication vector could be used for each new trigger indication. Alternatively, a sequence counter could be introduced, such that the MTC Devices will never accept a trigger indication with a sequence number that is not greater than those received previously. For any trigger indications that are to be sent to individual MTC Devices, the device specific session keys (CK', IK') can be used to encrypt these trigger indications.

Figure 6:
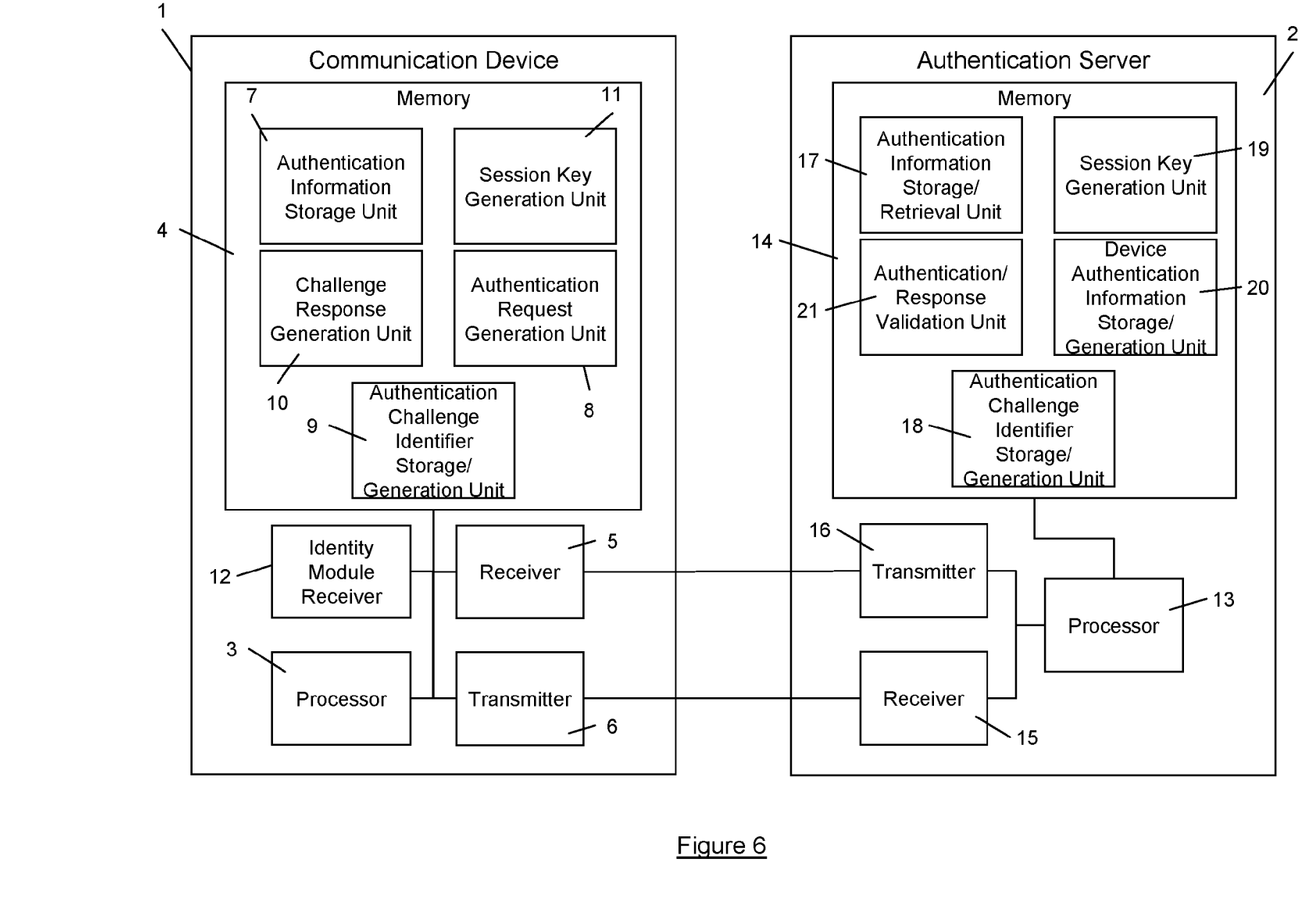
FIG. 6 illustrates schematically an example of a communication device and an authentication server suitable for implementing the authentication of a MTC Device.

FIG. 6 illustrates schematically an example of a communication device 1 and an authentication server 2 suitable for implementing the methods of authentication described above. The communication device 1 and the authentication server 2 can each be implemented as a combination of computer hardware and software.

The communication device 1 comprises a processor 3, a memory 4, a receiver 5 and a transmitter 6. The memory 4 stores the various programs/executable files that are implemented by the processor 3, and also provides a storage unit for any required data. The programs/executable files stored in the memory 4, and implemented by the processor 3, include but are not limited to an authentication information storage unit 7, an authentication request generation unit 9, an authentication challenge identifier storage/generation unit 9, a challenge response generation unit 10 and a session key generation unit 11. The communication device 1 can further comprise an identity module receiver 12 for receiving an identity module. For example, the identity module receiver 12 can be configured to receive an identity module in the form of hardware, such as a Universal Integrated Circuit Card (UICC) or smart card, or can be configured to receive an identity module in the form of software such as a downloadable Machine Communication Identity Module (MCIM).

The authentication server 2 comprises a processor 13, a memory 14, a receiver 15 and a transmitter 16. The memory 14 stores the various programs/executable files that are implemented by the processor 13, and also provides a storage unit for any required data. The programs/executable files stored in the memory 14, and implemented by the processor 13, include but are not limited to an authentication data storage/retrieval unit 17, a n authentication challenge identifier storage/generation unit 18, a session key generation unit 19, a device authentication information storage/generation unit 20 and an authentication response validation unit 21.

The methods and apparatus described above enable the authentication of an MTC Device that is part of a MTC Group to provide assurance that the MTC Device is part of that MTC Group whilst also providing assurance regarding the identity of the individual MTC Device. These methods and apparatus also minimise the number of authentication vectors that need to be generated in order to implement the authentication of groups of MTC Devices, and minimises the amount of signalling required to implement this authentication. Furthermore, these authentication mechanisms do not require any changes or modifications to the standard subscriber database functionality.

It will be appreciated by the person of skill in the art that various modifications may be made to the above-described embodiments without departing from the scope of the present invention. For example, whilst the above-described embodiments relate to the authentication of a MTC Device that is part of a MTC Group, they are equally applicable to the authentication of a group of communication devices of any type.

The invention claimed is:

1. A method of operating a communication device, the communication device being part of a group comprising two or more communication devices that share a subscription to a communication network, the method comprising:
  each of the two or more communication devices of the group receiving an identity module, which is stored by the one of the communication devices that receives the identity module, said identity module storing group authentication information at the respective one of the communication devices prior to receipt of a group authentication challenge from the network, wherein the group authentication information identifies the group utilizing an alias for an otherwise static Group ID of the group in order to provide privacy for the Group ID during subsequent communications, which include communications of receiving and responding to group authentication challenges;
  sending, by a specific one of the communication devices, a service request to the network, wherein the service request includes the alias as an identifier for the group;
  receiving a group authentication challenge from the network at the specific one of the communication devices, wherein the group authentication challenge is sent to all the communication devices of the group is in response to receipt of the service request, at least part of the group authentication challenge having been generated using group authentication information that is associated with the shared subscription;
  generating a device specific authentication response to the group authentication challenge, at the specific one of the communication devices, using the group authentication information, the device specific authentication information, and based on information provided by the identity module of the specific one of the communication devices, the generated device specific authentication response by the specific one of the communication devices being performed by further processing a group authentication response using the device specific authentication information, wherein the generating of the device specific authentication response utilizes a pseudo-random function (PRF) to ensure that an attacker, recording the device specific authentication response from the specific one of the communication devices, is unable to derive a proper device specific authentication response of any other ones of the communication devices within the group; and
  sending the device specific authentication response from the specific one of the communication devices to the network in a message that does not include the device specific authentication information of the specific one of the communication devices.

2. A method as claimed in claim 1, and further comprising:
  including an identifier for the communication device in the device specific authentication response sent to the network.

3. A method as claimed in claim 1, and further comprising:
  including an identifier for the group authentication challenge, which includes the alias, in the device specific authentication response sent to the network.

4. A method as claimed in claim 3, wherein the identifier for the group authentication challenge is received from the network together with the group authentication challenge.

5. A method as claimed in claim 3, and further comprising:
  using at least part of the group authentication challenge and an identifier for the group to derive the authentication challenge identifier for inclusion in the device specific authentication response.

6. A method of operating a node of a communication network in order to authenticate a communication device, the communication device being part of a group comprising two or more communication devices that share a subscription to a communication network, the method comprising:
  sending to each of the two or more communication devices of the group an identity module, which is stored by the one of the communication devices that receives the identity module, said identity module storing group authentication information at the respective one of the communication devices prior to receipt of a group authentication challenge from the communication network, wherein the group authentication information identifies the group utilizing an alias for an otherwise static Group ID of the group in order to provide privacy for the Group ID during subsequent communications, which include communications of receiving and responding to group authentication challenges;
  receiving, by a specific one of the communication devices, a service request to the communication network, wherein the service request includes the alias as an identifier for the group;
  sending the group authentication challenge all of the communication devices of the group is in response to receipt of the service request, wherein at least part of the group authentication challenge is generated using group authentication information that is associated with the shared subscription;
  receiving a device specific authentication response from the specific one of the communication devices, wherein the device specific authentication response is generated by the specific one of the communication devices using the group authentication information, the device specific authentication information, and based on information provided by the identity module of the specific one of the communication devices, the generated device specific authentication response by the specific one of the communication devices being performed by further processing a group authentication response using the device specific authentication information, wherein the generating of the device specific authentication response utilizes a pseudo-random function (PRF) to ensure that an attacker, recording the device specific authentication response from the specific one of the communication devices, is unable to derive a proper device specific authentication response of any other ones of the communication devices within the group, wherein the device specific authentication response does not include the device specific authentication information of the specific one of the communication devices;
  determining an identifier for the specific one of the communication devices from the device specific authentication response to establish device specific authentication information that is not included in the device specific authentication response; and
  using the device specific authentication information to determine if the received response is a valid response to the authentication challenge and, if so, authenticating the specific one of the communication devices.

7. A method as claimed in claim 6, wherein the step of using the group identifier to obtain a group authentication challenge and an expected response further comprises:
  sending a request for authentication data to a subscriber database, the request including the alias as the identifier for the group; and
  receiving a response from the subscriber database including the group authentication challenge and an expected response.

8. A method as claimed in claim 7, wherein using the device specific authentication information to determine if the received response is a valid response comprises:
  using the device specific authentication information and the expected response to generate a device specific expected response; and
  determining that the received response is valid if the device specific expected response matches the received response.

9. An apparatus configured to operate as a communication device that is part of a group comprising two or more communication devices that share a subscription to a communication network, the apparatus comprising:
  a receiver circuit configured to receive an identity module, which is stored by apparatus, said identity module storing group authentication information at the apparatus prior to receipt of a group authentication challenge from the network, wherein the group authentication information identifies the group utilizing an alias for an otherwise static Group ID of the group in order to provide privacy for the Group ID during subsequent communications, which include communications of receiving and responding to group authentication challenges, wherein each communication device in the group including the apparatus receives the identity module;
  a sending circuit configured to send a service request to the network, wherein the service request includes the alias as an identifier for the group;
  a receiver circuit configured to receive a group authentication challenge from the network at the apparatus, the group authentication challenge having been generated using group authentication information that is associated with the shared subscription, wherein the group authentication challenge was sent to all of the communication devices of the group is in response to receipt of the service request;
  a processor circuit configured to generate a device specific authentication response at the apparatus to the group authentication challenge using the group authentication information, the device specific authentication information, and based on information provided by the identity module of the specific one of the communication devices, the generated device specific authentication response by the specific one of the communication devices being performed by further processing a group authentication response using the device specific authentication information, wherein the generating of the device specific authentication response utilizes a pseudo-random function (PRF) to ensure that an attacker, recording the device specific authentication response from apparatus, is unable to derive a proper device specific authentication response of any other ones of the communication devices within the group; and
  a transmitter configured to send the device specific authentication response from the apparatus to the network in a message that does not include the device specific authentication information of the apparatus.

10. An apparatus as claimed in claim 9, wherein the apparatus is further configured to include an identifier for the communication device in the device specific authentication response sent to the network.

11. An apparatus as claimed in claim 9, wherein the apparatus is further configured to include an identifier, which includes the alias, for the group authentication challenge in the device specific authentication response sent to the network.

12. An apparatus as claimed in claim 11, wherein the apparatus is further configured to receive the identifier for the group authentication challenge from the network together with the group authentication challenge.

13. An apparatus as claimed in claim 11, wherein the apparatus is further configured to use at least part of the group authentication challenge and the identifier for the group to derive the authentication challenge identifier for inclusion in the device specific authentication response.

14. An apparatus configured to authenticate a communication device to a communication network, the communication device being part of a group comprising two or more communication devices that share a subscription to a communication network, the apparatus comprising:
  a transmitting circuit to sending to each of the two or more communication devices of the group an identity module, which is stored by the one of the communication devices that receives the identity module, said identity module storing group authentication information at the respective one of the communication devices prior to receipt of a group authentication challenge from the communication network, wherein the group authentication information identifies the group utilizing an alias for an otherwise static Group ID of the group in order to provide privacy for the Group ID during subsequent communications, which include communications of receiving and responding to group authentication challenges;
  a receiving circuit to receive, from a specific one of the communication devices, a service request to the communication network, wherein the service request includes the alias as an identifier for the group;
  a transmitter configured to send the group authentication challenge to all of the communication devices of the group is in response to receipt of the service request, wherein at least part of the group authentication challenge is generated using group authentication information that is associated with the shared subscription;
  a receiver configured to receive a device specific authentication response from the specific one of the communication devices, wherein the device specific authentication response is generated by the specific one of the communication devices using the group authentication information, the device specific authentication information, and based on information provided by the identity module of the specific one of the communication devices, the generated device specific authentication response by the specific one of the communication devices being performed by further processing a group authentication response using the device specific authentication information, wherein the generating of the device specific authentication response utilizes a pseudo-random function (PRF) to ensure that an attacker, recording the device specific authentication response from the specific one of the communication devices, is unable to derive a proper device specific authentication response of any other ones of the communication devices within the group, wherein the device specific authentication response does not include the device specific authentication information of the specific one of the communication devices;

wherein the processor circuit is configured to use an identifier for the specific one of the communication devices from the device specific authentication response to establish device specific authentication information that is not included in the device specific authentication response, and to use the device specific authentication information to determine if the received response is a valid response to the authentication challenge and thereby authenticate the specific one of the communication devices.

15. An apparatus as claimed in claim 14, wherein the apparatus is further configured to:

send a request for authentication data to a subscriber database, the request including the identifier for the group; and receive a response from the subscriber database including the group authentication challenge and the expected response.

16. An apparatus as claimed in claim 15, wherein the apparatus is further configured to:

use the device specific authentication information and the expected response to generate a device specific expected response; and determine that the received response is valid if the device specific expected response matches the received response.

17. A non-transitory computer-readable medium comprising computer program code stored thereupon, wherein the computer program code comprises program instructions that, when executed by a computer processor in a communication device, the communication device being part of a group comprising two or more communication devices that share a subscription to a communication network, cause the computer processor to:

receive an identity module, which is stored by the one of the communication devices that receives the identity module, said identity module storing group authentication information at the respective one of the communication devices prior to receipt of a group authentication challenge from the network, wherein the group authentication information identifies the group utilizing an alias for an otherwise static Group ID of the group in order to provide privacy for the Group ID during subsequent communications, which include communications of receiving and responding to group authentication challenges, wherein each of the two or more communication devices of the group receive the identity module;

send, by a specific one of the communication devices, a service request to the network, wherein the service request includes the alias as an identifier for the group;

receive a group authentication challenge from the network at the specific one of the communication devices, wherein the group authentication challenge is sent to all of the communication devices of the group is in response to receipt of the service request, at least part of the group authentication challenge having been generated using group authentication information that is associated with the shared subscription;

generate a device specific authentication response to the group authentication challenge, at the specific one of the communication devices, using the group authentication information, the device specific authentication information, and based on information provided by the identity module of the specific one of the communication devices, the generated device specific authentication response by the specific one of the communication devices being performed by further processing a group authentication response using the device specific authentication information, wherein the generating of the device specific authentication response utilizes a pseudo-random function (PRF) to ensure that an attacker, recording the device specific authentication response from the specific one of the communication devices, is unable to derive a proper device specific authentication response of any other ones of the communication devices within the group; and send the device specific authentication response from the specific one of the communication devices to the network in a message that does not include the device specific authentication information of the specific one of the communication devices.

18. A non-transitory computer-readable medium comprising computer program code stored thereupon for authenticating a communication device, the communication device being part of a group comprising two or more communication devices that share a subscription to a communication network, wherein the computer program code comprises program instructions that, when executed by a computer processor in a node of the communication network, cause the node to:

send to each of the two or more communication devices of the group an identity module, which is stored by the one of the communication devices that receives the identity module, said identity module storing group authentication information at the respective one of the communication devices prior to receipt of a group authentication challenge from the communication network, wherein the group authentication information identifies the group utilizing an alias for an otherwise static Group ID of the group in order to provide privacy for the Group ID during subsequent communications, which include communications of receiving and responding to group authentication challenges;

receive, by a specific one of the communication devices, a service request to the communication network, wherein the service request includes the alias as an identifier for the group;

send the group authentication challenge all of the communication devices of the group is in response to receipt of the service request, wherein at least part of the group authentication challenge is generated using group authentication information that is associated with the shared subscription;

receive a device specific authentication response from the specific one of the communication devices, wherein the device specific authentication response is generated by the specific one of the communication devices using the group authentication information, the device specific authentication information, and based on information provided by the identity module of the specific one of the communication devices, the generated device specific authentication response by the specific one of the communication devices being performed by further processing a group authentication response using the device specific authentication information, wherein the generating of the device specific authentication response utilizes a pseudo-random function (PRF) to ensure that an attacker, recording the device specific authentication response from the specific one of the communication devices, is unable to derive a proper device specific authentication response of any other ones of the communication devices within the group, wherein the device specific authentication response does not include the device specific authentication information of the specific one of the communication devices;

determine an identifier for the specific one of the communication devices from the device specific authentication response to establish device specific authentication information that is not included in the device specific authentication response; and use the device specific authentication information to determine if the received response is a valid response to the authentication challenge and, if so, authenticating the specific one of the communication devices.

\* \* \* \* \*